US012645124B2

(12) United States Patent
Zhang

(10) Patent No.: US 12,645,124 B2
(45) Date of Patent: Jun. 2, 2026

(54) DISPLAY PANEL AND ELECTRONIC DEVICE

(71) Applicant: Honor Device Co., Ltd., Shenzhen (CN)

(72) Inventor: Shuai Zhang, Shenzhen (CN)

(73) Assignee: Honor Device Co., Ltd., Shenzen (CN)

( * ) Notice: Subject to any disclaimer, the term of this patent is extended or adjusted under 35 U.S.C. 154(b) by 465 days.

(21) Appl. No.: 18/279,327

(22) PCT Filed: Sep. 2, 2022

(86) PCT No.: PCT/CN2022/116720
§ 371 (c)(1),
(2) Date: Aug. 29, 2023

(87) PCT Pub. No.: WO2023/071523
PCT Pub. Date: May 4, 2023

(65) Prior Publication Data
US 2024/0168353 A1    May 23, 2024

(30) Foreign Application Priority Data
Oct. 28, 2021    (CN) .......................... 202111263082.5

(51) Int. Cl.
*G02F 1/15*        (2019.01)
*G02B 26/00*       (2006.01)
(Continued)

(52) U.S. Cl.
CPC .............. *G02F 1/163* (2013.01); *G02F 1/155* (2013.01); *G06V 40/16* (2022.01); *G02F 2203/11* (2013.01)

(58) Field of Classification Search
CPC ...... G02F 1/155; G02F 1/1525; G02F 1/1521; G02F 1/1533; G02F 1/03; G02F 1/0316;
(Continued)

(56) References Cited

U.S. PATENT DOCUMENTS 11,580,782 B2    2/2023  Wang et al.
11,719,989 B2 *  8/2023  Cai ........................ G02F 1/1533
                                              359/275
(Continued)

FOREIGN PATENT DOCUMENTS

CN        105763774 A    7/2016
CN        110245627 A    9/2019
(Continued)

*Primary Examiner* — Dawayne Pinkney
(74) *Attorney, Agent, or Firm* — Slater Matsil, LLP

(57) ABSTRACT

Embodiments of this application provide a display panel and an electronic device. For the display panel, in an under-display photographing area, an electrochromic layer is disposed on a light-emitting side of a display layer, and the electrochromic layer does not overlap a pixel area in a direction perpendicular to a plane on which the display panel is located; a first electrode layer is disposed on a side that is of the electrochromic layer and that is close to the display layer, and a second electrode layer is disposed on a side that is of the electrochromic layer and that is away from the display layer; and the electrochromic layer has a first light absorption feature under action of a first voltage difference, and has a second light absorption feature under action of a second voltage difference.

10 Claims, 10 Drawing Sheets

(51) Int. Cl.

| | |
|---|---|
| *G02F 1/01* | (2006.01) |
| *G02F 1/1503* | (2019.01) |
| *G02F 1/153* | (2006.01) |
| *G02F 1/155* | (2006.01) |
| *G02F 1/163* | (2006.01) |
| *G06V 40/16* | (2022.01) |
| *G09G 3/19* | (2006.01) |

(58) Field of Classification Search
CPC ......... G02F 3/16; G02F 3/163; H04N 9/3137; H04N 9/22; B60R 1/088; C09K 9/02
USPC ................ 359/265–275, 277, 245–247, 242; 345/49, 105, 107; 248/817; 438/929
See application file for complete search history.

(56) References Cited

U.S. PATENT DOCUMENTS

| | | | |
|---|---|---|---|
| 2015/0317464 A1 | 11/2015 | Willis et al. | |
| 2020/0105842 A1* | 4/2020 | Qi ........................... G02F 1/157 |
| 2020/0363691 A1 | 11/2020 | Cai | |

FOREIGN PATENT DOCUMENTS

| | | | | | |
|---|---|---|---|---|---|
| CN | 111863922 A | 10/2020 | | | |
| CN | 112885237 A | 6/2021 | | | |
| CN | 113130607 A | 7/2021 | | | |
| CN | 112965314 A | 4/2023 | | | |
| JP | 2008124941 A | 5/2008 | | | |
| WO | WO-2022206541 A1 * | 10/2022 | ............. | G02F 1/163 |

* cited by examiner

DISPLAY PANEL AND ELECTRONIC DEVICE

CROSS-REFERENCE TO RELATED APPLICATIONS

This application is a national stage of International Application No. PCT/CN2022/116720, filed on Sep. 2, 2022, which claims priority to Chinese Patent Application No. 202111263082.5, filed on Oct. 28, 2021. The disclosures of both of the aforementioned applications are hereby incorporated by reference in their entireties.

TECHNICAL FIELD

This application relates to the field of display technologies, and in particular, to a display panel and an electronic device.

BACKGROUND

The under-display camera technology is increasingly applied to electronic products, and a camera needs to be manufactured below a screen in the under-display camera technology. With development of technologies, there are two types of under-display cameras. One is a visible light camera, and the other is a time-of-flight (Time-of-Flight, ToF) camera. The visible light camera is configured to take a photo, and the ToF camera is configured to use infrared light to perform facial recognition by using depth-of-field data. Therefore, to implement the two functions, both the visible light camera and the ToF camera need to be disposed as under-display cameras. The visible light camera is equipped with a filter with a high visible light transmittance, and the ToF camera is equipped with a filter with a high infrared light transmittance. Because two types of under-display cameras are disposed, more optical components have great adverse impact on display.

SUMMARY

A display panel and an electronic device are provided, to reduce adverse impact of an under-display optical component on display.

According to a first aspect, a display panel is provided, including: a display layer, where the display layer includes a non-pixel area and a plurality of pixel areas, and a light-emitting component is disposed in each pixel area; the display panel includes a display area, and the display area includes an under-display photographing area and a non-under-display photographing area; in the under-display photographing area, an electrochromic layer is disposed on a light-emitting side of the display layer, and the electrochromic layer does not overlap the pixel area in a direction perpendicular to a plane on which the display panel is located; a first electrode layer is disposed on a side that is of the electrochromic layer and that is close to the display layer, and a second electrode layer is disposed on a side that is of the electrochromic layer and that is away from the display layer; and the electrochromic layer has a first light absorption feature under action of a first voltage difference, and has a second light absorption feature under action of a second voltage difference. The first light absorption feature is that the electrochromic layer has a first absorption rate for visible light and has a second absorption rate for infrared light, and the second light absorption feature is that the electrochromic layer has a third absorption rate for the visible light and a fourth absorption rate for the infrared light. The first absorption rate is greater than the third absorption rate, and the second absorption rate is less than the fourth absorption rate.

In a possible implementation, the electrochromic layer includes a plurality of mutually independent electrochromic parts; the first electrode layer or the second electrode layer includes a plurality of mutually independent color-changing electrodes; and the plurality of mutually independent electrochromic parts are in a one-to-one correspondence with the plurality of mutually independent color-changing electrodes.

In a possible implementation, the plurality of pixel areas are arranged in a matrix including a plurality of pixel rows and a plurality of pixel columns; the plurality of electrochromic parts include a plurality of first electrochromic parts and a plurality of second electrochromic parts; each of the first electrochromic parts is located in the pixel row or the pixel column; and each of the second electrochromic parts is located outside any pixel row and any pixel column.

In a possible implementation, the electrochromic part is circular in the direction perpendicular to the plane on which the display panel is located.

In a possible implementation, the electrochromic layer is further disposed in the non-under-display photographing area.

In a possible implementation, a part that is of the electrochromic layer and that is in the under-display photographing area and a part that is of the electrochromic layer and that is in the non-under-display photographing area are independent of each other; and a part that is of either of the first electrode layer and the second electrode layer and that is in the under-display photographing area and a part that is of either of the first electrode layer and the second electrode layer and that is in the non-under-display photographing area are independent of each other.

According to a second aspect, an electronic device is provided, including: the foregoing display panel; a front-facing camera, where the front-facing camera is located in the under-display photographing area of the display panel, and the front-facing camera is located on a non-light-emitting side of the display layer; and a processor, where the processor is configured to: when the electronic device operates in a facial recognition mode of the front-facing camera, control the electrochromic layer located in the under-display photographing area to have the first light absorption feature; and when the electronic device operates in a photographing mode of the front-facing camera, control at least a part of the electrochromic layer located in the under-display photographing area to have the second light absorption feature.

In a possible implementation, the electrochromic layer includes a plurality of mutually independent electrochromic parts; the first electrode layer or the second electrode layer includes a plurality of mutually independent color-changing electrodes, and the plurality of mutually independent electrochromic parts are in a one-to-one correspondence with the plurality of mutually independent color-changing electrodes; the plurality of pixel areas are arranged in a matrix including a plurality of pixel rows and a plurality of pixel columns; the plurality of electrochromic parts include a plurality of first electrochromic parts and a plurality of second electrochromic parts; each of the first electrochromic parts is located in the pixel row or the pixel column; each of the second electrochromic parts is located outside any pixel row and any pixel column; and the processor is specifically configured to: when a scene contrast in a photographing preview image of the front-facing camera is greater than a preset value, and the electronic device operates in the photographing mode of the front-facing camera, control the plurality of electrochromic parts in the under-display photographing area, so that each of the first electrochromic parts has the second light absorption feature, and each of the second electrochromic parts has the first light absorption feature.

In a possible implementation, the processor is specifically configured to: when the scene contrast in the photographing preview image of the front-facing camera is not greater than the preset value, determine a light absorption feature arrangement based on the current photographing preview image; and when the electronic device operates in the photographing mode of the front-facing camera, control the plurality of electrochromic parts in the under-display photographing area based on the currently determined light absorption feature arrangement.

In a possible implementation, the electrochromic part is circular in the direction perpendicular to the plane on which the display panel is located.

In a possible implementation, the electrochromic layer is further disposed in the non-under-display photographing area; a part that is of the electrochromic layer and that is in the under-display photographing area and a part that is of the electrochromic layer and that is in the non-under-display photographing area are independent of each other; a part that is of either of the first electrode layer and the second electrode layer and that is in the under-display photographing area and a part that is of either of the first electrode layer and the second electrode layer and that is in the non-under-display photographing area are independent of each other; and the processor is further configured to control the electrochromic layer located in the non-under-display photographing area to have the first light absorption feature.

In a possible implementation, the processor is further configured to: when the electronic device operates in an operating mode of a non-front-facing camera, control the electrochromic layer to have the first light absorption feature.

According to the display panel and the electronic device in the embodiments of this application, the electrochromic layer, the first electrode layer, and the second electrode layer are disposed in the under-display photographing area. The electrochromic layer may have different light absorption features under action of a difference between voltages applied to the two electrode layers. In the first light absorption feature, the electrochromic layer has a high visible light absorption rate and a low infrared light absorption rate, and therefore is applicable to a facial recognition scenario. In the second light absorption feature, the electrochromic layer has a low visible light absorption rate and a high infrared light absorption rate, and therefore is applicable to a photographing scenario. Therefore, different types of front-facing cameras may not need to be disposed in the two scenarios for distinguishing, and the two functions of facial recognition and photographing can be implemented by using a same type of camera to cooperate with a light absorption feature change of the electrochromic layer, so that a quantity of front-facing cameras in the under-display photographing area can be decreased, thereby reducing adverse impact of an under-display optical component on display. In addition, in a scenario in which facial recognition does not need to be performed by using the front-facing camera, the electrochromic layer may be controlled to have a high visible light absorption rate, that is, a light shielding function of a BM may be implemented by using the electrochromic layer, so as to reduce reflection of external ambient light by the display panel, thereby improving a display effect.

DETAILED DESCRIPTION OF ILLUSTRATIVE EMBODIMENTS

Terms used in implementations of this application are merely used to explain specific embodiments of this application, and are not intended to limit this application.

Figure 1:
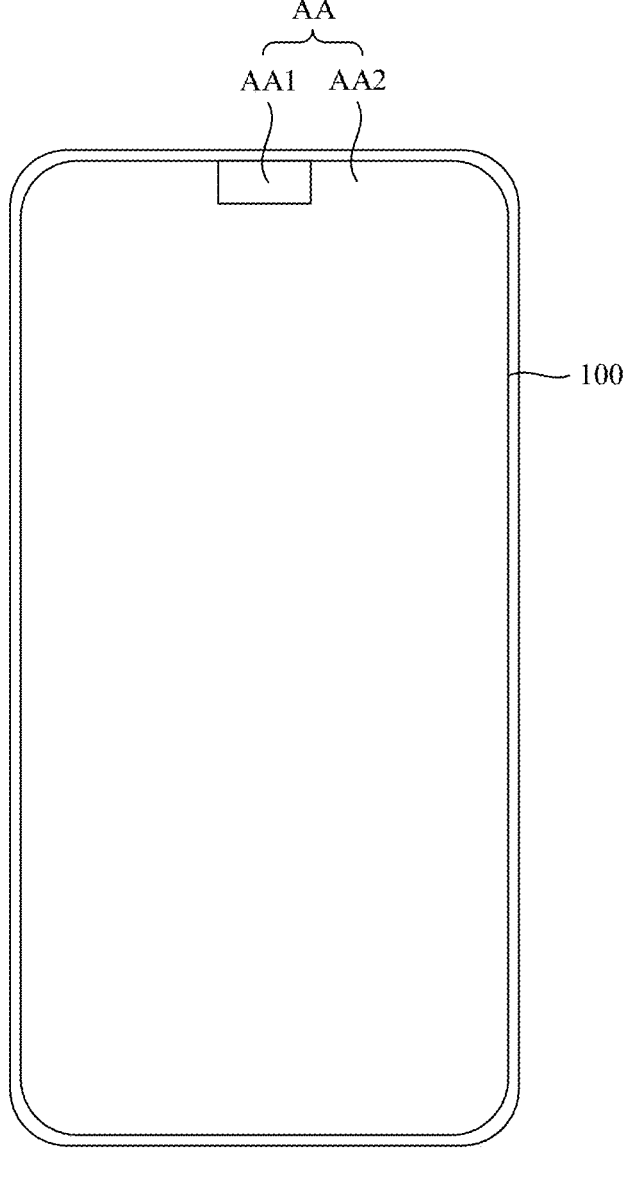
FIG. 1 is a schematic diagram of a structure of a display panel according to an embodiment of this application.
Figure 2:
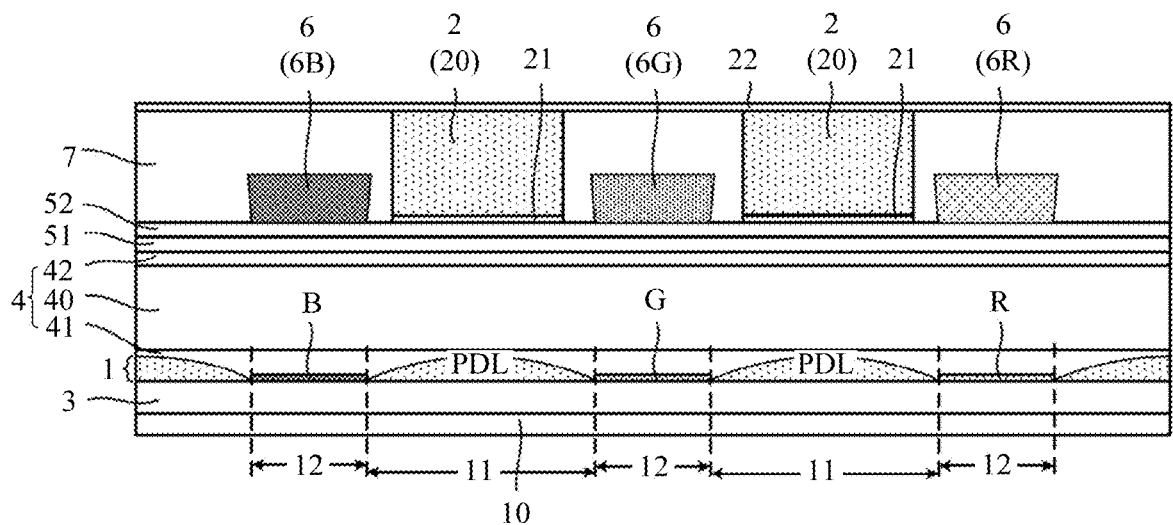
FIG. 2 is a schematic diagram of a cross-section structure of a part of an under-display photographing area in FIG. 1.
Figure 3:
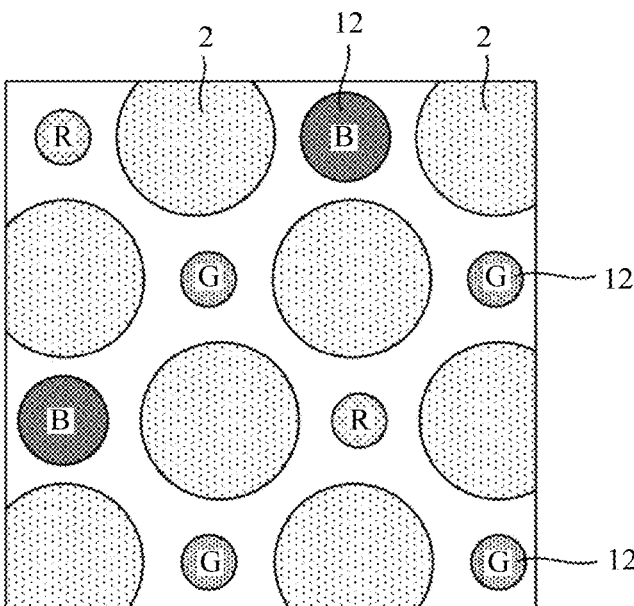
FIG. 3 is an enlarged schematic diagram of a part of an under-display photographing area in FIG. 1.
Figure 4:
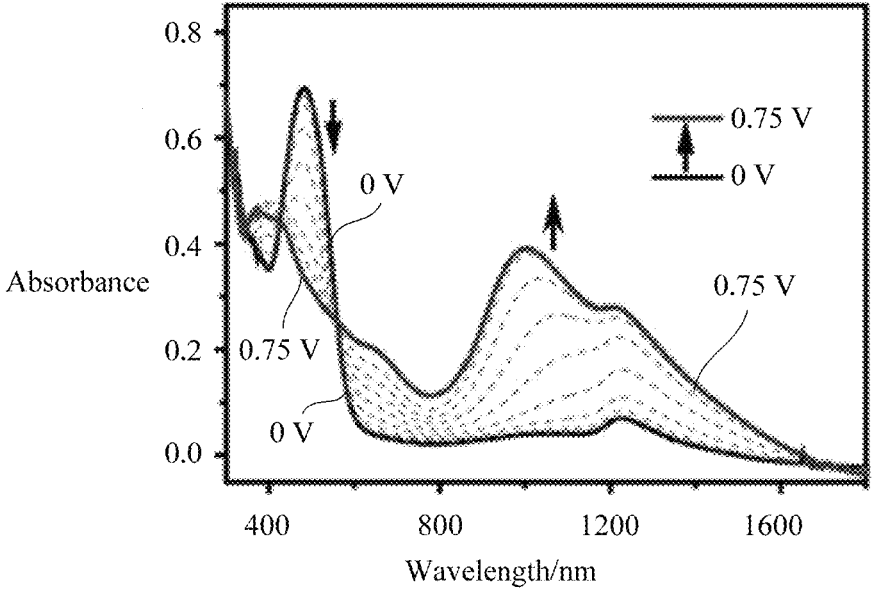
FIG. 4 is a schematic diagram of an absorption spectrum curve of a material of an electrochromic layer according to an embodiment of this application.
Figure 5:
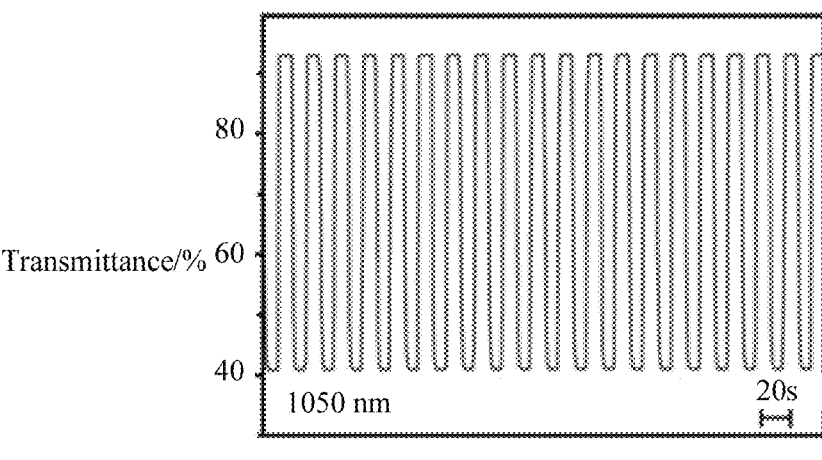
FIG. 5 is a schematic diagram of a curve of a change in a transmittance of an electrochromic material with time according to an embodiment of this application.
Figure 6:
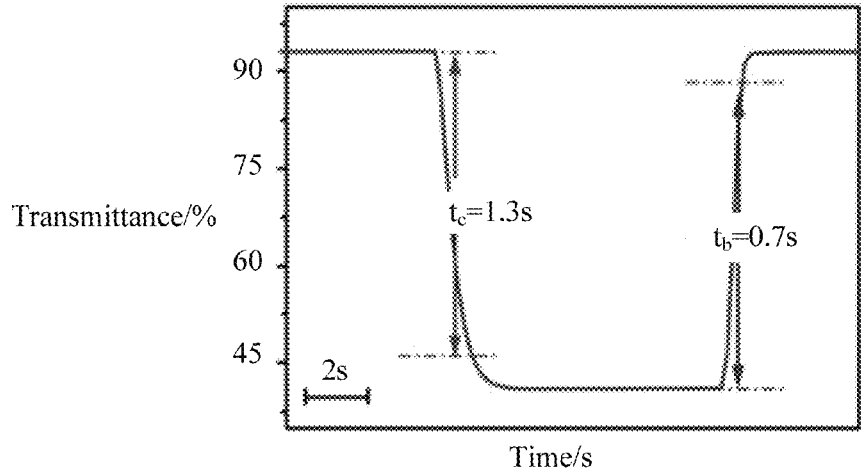
FIG. 6 is a specific schematic diagram of a part of time in FIG. 5.

As shown in FIG. 1 to FIG. 3, an embodiment of this application provides a display panel, including a display layer 1. The display layer 1 includes a non-pixel area 11 and a plurality of pixel areas 12. The non-pixel area 11 has a pixel define layer (pixel define layer, PDL), the pixel define layer PDL has an opening, and the opening at the pixel define layer PDL defines the pixel area 12. A light-emitting component is disposed in each pixel area 12. For example, the light-emitting component includes a red light-emitting component R, a green light-emitting component G, and a blue light-emitting component B. One light-emitting component is disposed in one pixel area 12, and the light-emitting components are arranged in an array. In a direction perpendicular to a plane on which the display panel is located, the light-emitting component includes an anode, a light-emitting material layer, and a cathode. Anodes of different light-emitting components are independent of each other, to provide corresponding anode voltages for the different light-emitting components by using the anodes. Cathodes of different light-emitting components may be a continuous film layer, and a uniform cathode voltage may be provided for the light-emitting components by using the cathodes. The light-emitting material layer emits light under action of a difference between voltages provided for the anode and the cathode, and brightness of emitted light is related to the voltage difference between the anode and the cathode. In other words, the pixel area 12 is used to display emitted light, and the non-pixel area 11 does not emit light. The display panel includes a display area AA, and the display area AA includes an under-display photographing area AA1 and a non-under-display photographing area AA2. In the under-display photographing area AA1, an electrochromic layer 2 is disposed on a light-emitting side of the display layer 1. The electrochromic layer 2 does not overlap the pixel area 12 in the direction perpendicular to the plane on which the display panel is located, so as to avoid impact of the electrochromic layer 2 on display. A first electrode layer 21 is disposed on a side that is of the electrochromic layer 2 and that is close to the display layer 1, and a second electrode layer 22 is disposed on a side that is of the electrochromic layer 2 and that is away from the display layer 1. Under action of a difference between voltages applied to the first electrode layer 21 and the second electrode layer 22, the electrochromic layer 2 has a light absorption feature corresponding to the voltage difference. The first electrode layer 21 and the second electrode layer 22 are transparent electrode layers, and the first electrode layer 21 and the second electrode layer 22 may be, for example, made of an indium tin oxide (Indium Tin Oxide, ITO) material. The electrochromic layer 2 has a first light absorption feature under action of a first voltage difference (for example, 0 V), and has a second light absorption feature under action of a second voltage difference (for example, 0.75 V). The first light absorption feature is that the electrochromic layer 2 has a first absorption rate for visible light and has a second absorption rate for infrared light, and the second light absorption feature is that the electrochromic layer 2 has a third absorption rate for the visible light and has a fourth absorption rate for the infrared light. The first absorption rate is greater than the third absorption rate, and the second absorption rate is less than the fourth absorption rate. The voltages are applied to the first electrode layer 21 and the second electrode layer 22, so that the light absorption feature of the electrochromic layer 2 can be controlled by using the difference between the voltages applied to the first electrode layer 21 and the second electrode layer 22. For example, FIG. 4 shows an absorption spectrum of a material of the electrochromic layer 2. Under action of the first voltage difference of 0 V, the electrochromic layer 2 has stronger light absorption for a visible band and weaker light absorption for an infrared band, that is, visible light can be shielded and infrared light can be transmitted. Under action of the second voltage difference of 0.75 V, the electrochromic layer 2 has weaker light absorption for the visible band and has stronger light absorption for the infrared band, that is, the visible light can be transmitted and the infrared light can be shielded. FIG. 5 shows a curve of a change in a transmittance generated by a material of an electrochromic layer for light with a wavelength of 1050 nm under action of different voltage differences during time of 20 s according to this embodiment of this application. FIG. 6 shows a curve of a change in a transmittance generated by a material of an electrochromic layer for light with a wavelength of 1050 nm under action of different voltage differences during time of 2 s according to this embodiment of this application. It can be learned that the transmittance of the material of the electrochromic layer correspondingly changes based on a change of a voltage difference. Change time of a process in which the transmittance changes from low to high is $t_b$=0.7 s, and change time of a process in which the transmittance changes from high to low is $t_c$=1.3 s. If the transmittance can still reach an original level after changing a plurality of times, it indicates that the transmittance of the electrochromic layer 2 can be repeatedly controlled by using the voltage difference.

Specifically, when the display panel is applied to an electronic device, a front-facing camera 10 is disposed on a non-light-emitting side of the display layer 1, that is, a side that is of the display layer 1 and that is away from the electrochromic layer 2. The front-facing camera 10 overlaps the electrochromic layer 2 in the direction perpendicular to the plane on which the display panel is located. Two types of cameras do not need to be separately disposed for the front-facing camera 10 in this embodiment of this application. The front-facing camera 10 in this embodiment of this application has two functions: visible light photographing and ToF photographing. When the electronic device operates in a facial recognition mode of the front-facing camera, the electrochromic layer 2 located in the under-display photographing area AA1 may be controlled to have the first light absorption feature, that is, the electrochromic layer 2 is enabled to have a high transmittance for infrared light and have strong absorption for visible light, so that the front-facing camera 10 can receive the infrared light by using the electrochromic layer 2, to implement a facial recognition function. When the electronic device operates in a photographing mode of the front-facing camera, at least a part of the electrochromic layer 2 in the under-display photographing area AA1 may be controlled to have the second light absorption feature, that is, the electrochromic layer 2 is enabled to have strong absorption for the infrared light and have a high transmittance for the visible light. In this scenario, the front-facing camera 10 can receive stronger visible light by using the electrochromic layer 2, to implement a photographing function by using the visible light. In addition, in all scenarios other than a scenario in the facial recognition mode of the front-facing camera, the electrochromic layer 2 may be controlled to have the first light absorption feature, that is, the electrochromic layer 2 is enabled to have strong absorption for the visible light, to implement impedance of the visible light. The electrochromic layer 2 does not overlap the pixel area 12, and therefore does not affect a normal display function, but blocks a circuit, a component, or the like corresponding to the non-pixel area 11, and therefore reduces adverse impact on display that is caused by reflection, in the non-pixel area 11, of reflected light in an external environment. In other words, a function of a black matrix (Black Matrix, BM) can be implemented by using the electrochromic layer 2.

According to the display panel in this embodiment of this application, the electrochromic layer, the first electrode layer, and the second electrode layer are disposed in the under-display photographing area. The electrochromic layer may have different light absorption features under action of a difference between voltages applied to the two electrode layers. In the first light absorption feature, the electrochromic layer has a high visible light absorption rate and a low infrared light absorption rate, and therefore is applicable to a facial recognition scenario. In the second light absorption feature, the electrochromic layer has a low visible light absorption rate and a high infrared light absorption rate, and therefore is applicable to a photographing scenario. Therefore, different types of front-facing cameras may not need to be disposed in the two scenarios for distinguishing, and the two functions of facial recognition and photographing can be implemented by using a same type of camera to cooperate with a light absorption feature change of the electrochromic layer, so that a quantity of front-facing cameras in the under-display photographing area can be decreased, thereby reducing adverse impact of an under-display optical component on display. In addition, in a scenario in which facial recognition does not need to be performed by using the front-facing camera, the electrochromic layer may be controlled to have a high visible light absorption rate, that is, a light shielding function of a BM may be implemented by using the electrochromic layer, so as to reduce reflection of external ambient light by the display panel, thereby improving a display effect.

Figure 7:
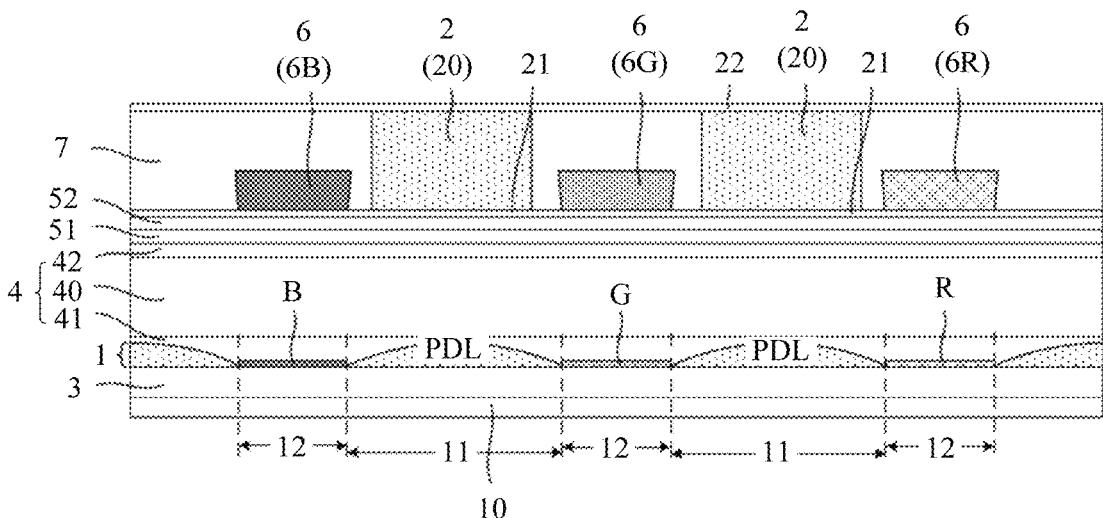
FIG. 7 is a schematic diagram of another cross-section structure of a part of an under-display photographing area in FIG. 1.
Figure 8:
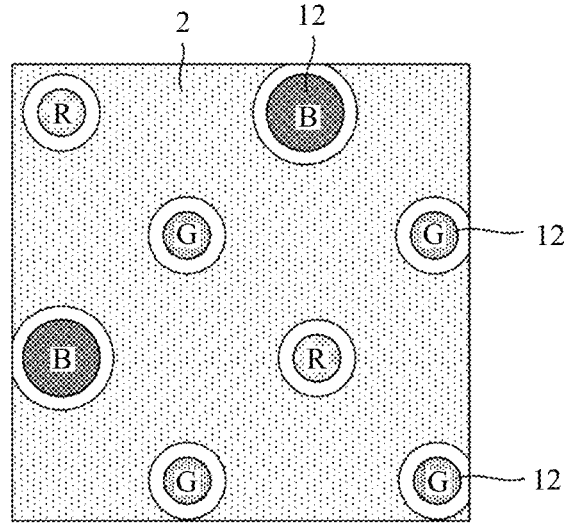
FIG. 8 is another enlarged schematic diagram of a part of an under-display photographing area in FIG. 1.

In a possible implementation, as shown in FIG. 7 and FIG. 8, in the under-display photographing area AA1, the electrochromic layer 2 may be of a continuous whole-layer structure, provided that the light-emitting component can be exposed. In addition, the first electrode layer 21 and the second electrode layer 22 each may also be of a continuous whole-layer structure. Moreover, because the first electrode layer 21 and the second electrode layer 22 are transparent electrodes, and therefore have no adverse impact on light emitting of the light-emitting component. The electrochromic layer 2 in the under-display photographing area AA1 may be centrally controlled as a whole by using the first electrode layer 21 and the second electrode layer 22, and a structure is simple.

Figure 9:
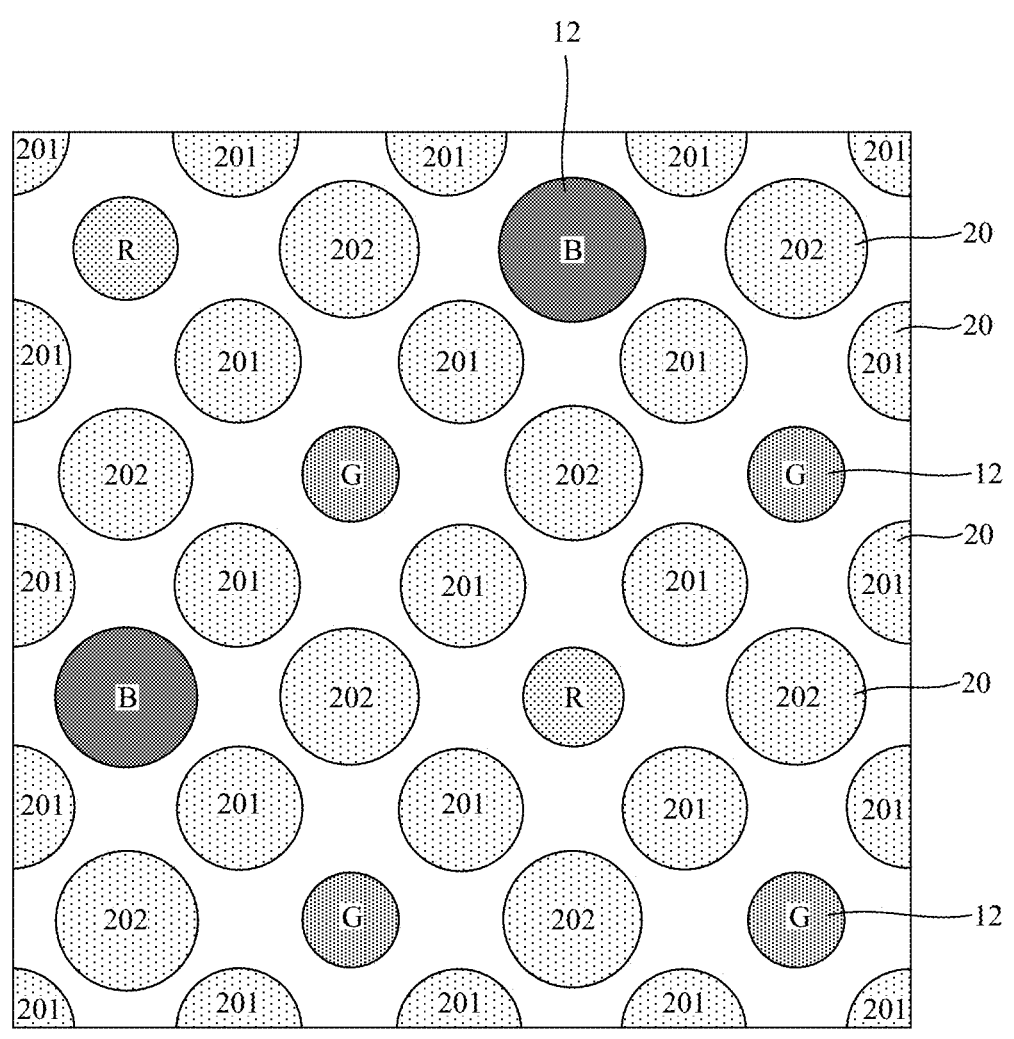
FIG. 9 is another enlarged schematic diagram of a part of an under-display photographing area in FIG. 1.
Figure 9:

The front-facing camera performs photographing by receiving external light at different light-transmitting locations. Therefore, a diffractive spot easily appears in a photographing process, which affects an effect of a shot photo. A shape arrangement in a light-transmitting area is an internal factor of the diffractive spot, and a shape of an external light source is an external factor of the diffractive spot. For example, a specific light-transmitting location arrangement has a good improvement effect on diffraction of a fluorescent lamp, but has no improvement effect on diffraction of a street lamp. Based on the foregoing diffraction problem, in a possible implementation, as shown in FIG. 2 and FIG. 9, the electrochromic layer 2 includes a plurality of mutually independent electrochromic parts 20; the first electrode layer 21 or the second electrode layer 22 includes a plurality of mutually independent color-changing electrodes; and the plurality of mutually independent electrochromic parts 20 are in a one-to-one correspondence with the plurality of mutually independent color-changing electrodes. For example, the first electrode layer 21 includes a plurality of mutually independent color-changing electrodes, each color-changing electrode is connected to a processor, and the processor may separately apply a voltage to each color-changing electrode. The second electrode layer 22 may be an electrode of a whole layer, and a uniform voltage is applied to the second electrode layer 22. For example, a voltage of 0 V is applied to the second electrode layer 22, and different voltages are applied to different color-changing electrodes. Therefore, different electrochromic parts 20 may have different voltage differences, so that the different electrochromic parts 20 have different light absorption features. Based on the structure, when the electronic device operates in the photographing mode of the front-facing camera, in different external environment scenarios, different light absorption feature arrangements of the electrochromic part 20 may correspond to corresponding scenarios to reduce diffractive spots, so as to improve an image effect of a photo. Therefore, a part that is of the electrochromic part 20 and that is located in the under-display photographing area AA1 may be controlled to have the first light absorption feature, and the other part of the electrochromic part 20 may be controlled to have the second light absorption feature, so that a corresponding photographing diffraction problem in a specific scenario is improved by using the light absorption feature arrangement of the electrochromic part 20.

In a possible implementation, the plurality of pixel areas 12 are arranged in a matrix including a plurality of pixel rows and a plurality of pixel columns. For example, an X direction is a row direction, a Y direction is a column direction, a plurality of pixel areas 12 in each pixel row are arranged in the X direction, and a plurality of pixel areas 12 in each pixel column are arranged in the Y direction. The plurality of electrochromic parts 20 include a plurality of first electrochromic parts 201 and a plurality of second electrochromic parts 202. Each of the first electrochromic parts 201 is located in the pixel row or the pixel column, that is, each of the first electrochromic parts 201 is located between two adjacent pixel areas 12 in the pixel row or the pixel column. Each of the second electrochromic parts 202 is located outside any pixel row and any pixel column. All the pixel areas 12 and the electrochromic parts 20 are arranged in a matrix.

In a possible implementation, the electrochromic part 20 is circular in the direction perpendicular to the plane on which the display panel is located, to help improve diffraction.

Figure 10:
FIG. 10 is a schematic diagram of a diffraction effect in a photographing environment.
Figure 11:
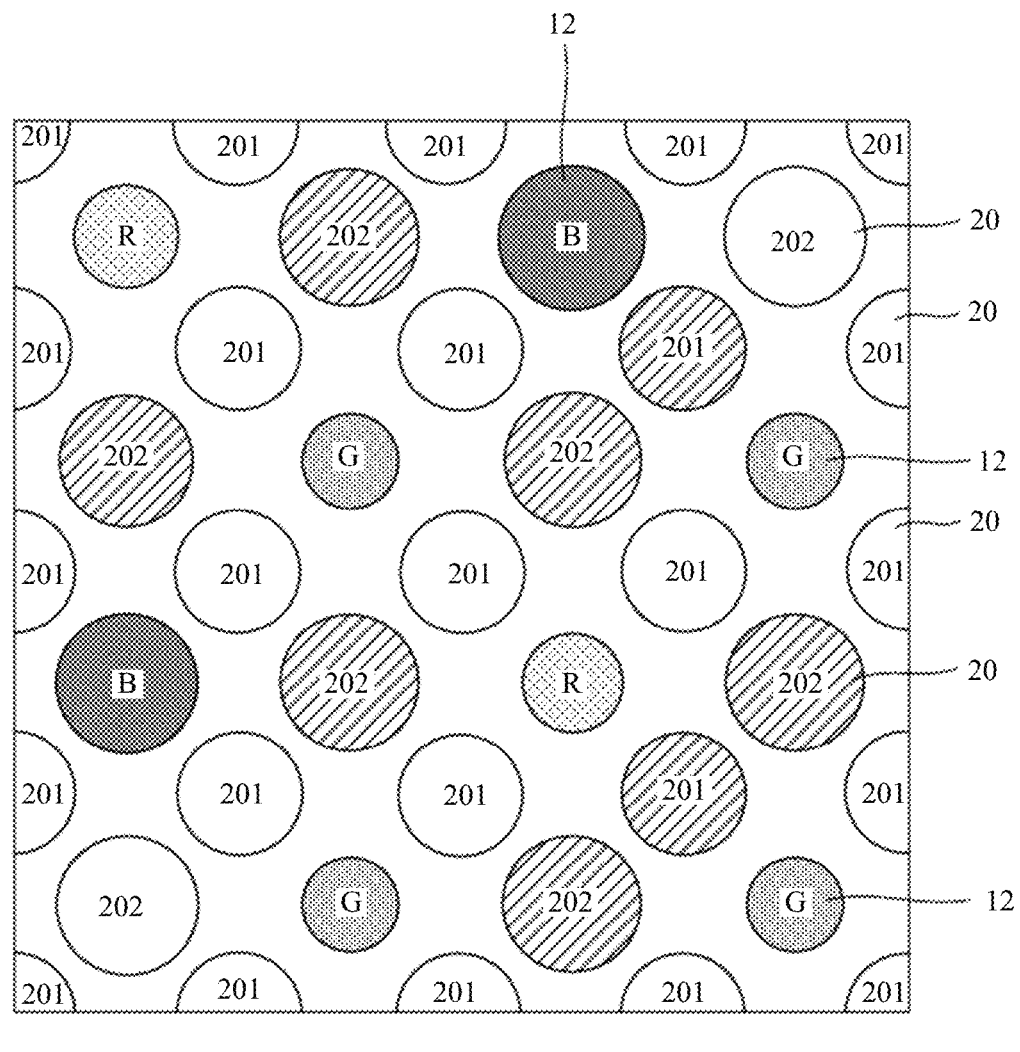
FIG. 11 is another enlarged schematic diagram of a part of an under-display photographing area in FIG. 1.
Figure 12:
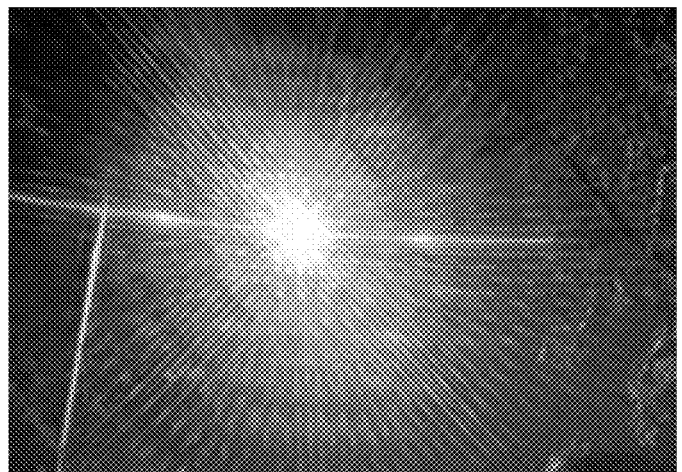
FIG. 12 is a schematic diagram of a diffraction effect in another photographing environment.
Figure 13:
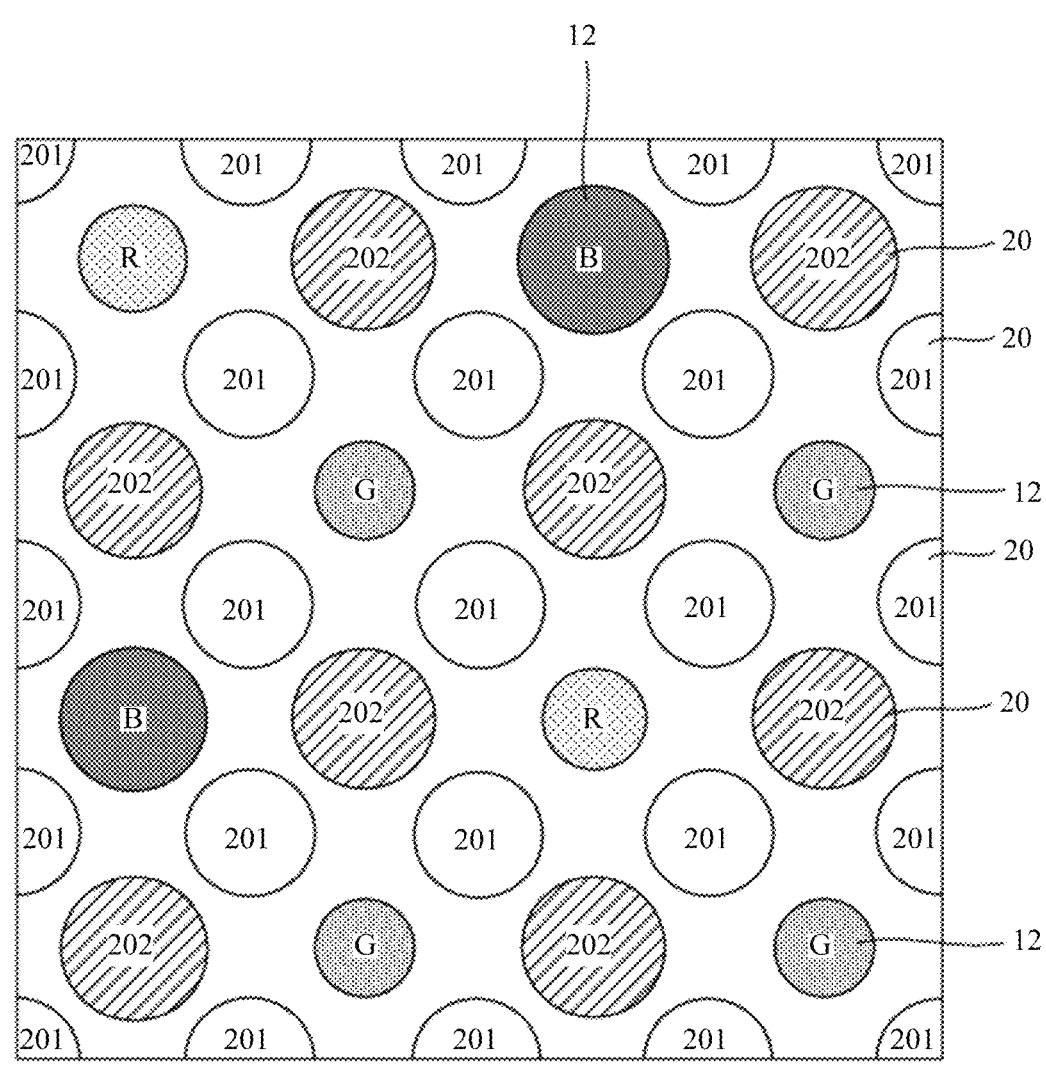
FIG. 13 is another enlarged schematic diagram of a part of an under-display photographing area in FIG. 1.
Figure 13:
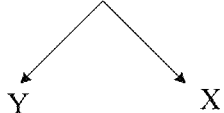

Specifically, some typical images may be obtained in advance. In a photographing preview mode, a preview image is compared with the typical image to obtain a feature of the preview image, and the light absorption feature arrangement of the electrochromic part 20 is controlled for the feature of the preview image, so as to improve diffraction. For example, as shown in FIG. 10, in an indoor downlight or square light scenario, because an environment is bright, a contrast between the light and the environment is not high, and a diffraction order is usually less than or equal to 3, the light absorption feature arrangement of the electrochromic part 20 may be adaptively controlled based on the diffraction order range that is obtained through determining by using the preview image. For example, the light absorption feature arrangement of the electrochromic part 20 is shown in FIG. 11, where the electrochromic part 20 without filling has the second light absorption feature, and has a low absorption rate and a high transmittance for visible light; and the electrochromic part 20 filled with slashes has the first light absorption feature, and has a high absorption rate and a low transmittance for the visible light, so as to help improve diffraction in the scenario. In addition, as shown in FIG. 12, in an outdoor scenario with a high contrast, an order of diffraction caused by a large street lamp may reach up to N, where N is greater than 3. Therefore, the light absorption feature arrangement of the electrochromic part 20 may be controlled as follows: light absorption features are arranged in an orthogonal direction in which pixels are arranged, for example, as shown in FIG. 13. The first electrochromic part 201 has the first light absorption feature, and has a low absorption rate and a high transmittance for visible light; and the second electrochromic part 202 has the second light absorption feature, and has a high absorption rate and a low transmittance for the visible light, so as to help improve diffraction in the scenario. In addition, at a software layer, artificial intelligence (Artificial Intelligence, AI) learning may be further used to tune and optimize control over the light absorption feature arrangement of the electrochromic part 20, so as to optimize an effect of diffraction improvement.

In a possible implementation, the electrochromic layer 2 is further disposed in the non-under-display photographing area AA2. In the non-under-display photographing area AA2, selection of different light by the front-facing camera does not need to be considered, and only the electrochromic layer 2 needs to be used to replace an original BM, to shield light in the non-pixel area and reduce reflection of external ambient light. It should be noted that, in another possible implementation, the electrochromic layer 2 may not be disposed in the non-under-display photographing area AA2, but a conventional light-shielding material is used as a BM, to shield light in the non-pixel area in the non-under-display photographing area AA2.

In a possible implementation, a part that is of the electrochromic layer 2 and that is in the under-display photographing area AA1 and a part that is of the electrochromic layer 2 and that is in the non-under-display photographing area AA2 are independent of each other; and a part that is of either of the first electrode layer 21 and the second electrode layer 22 and that is in the under-display photographing area AA1 and a part that is of either of the first electrode layer 21 and the second electrode layer 22 and that is in the non-under-display photographing area AA2 are independent of each other. The electrochromic layer 2 in the under-display photographing area AA1 needs to be used to select different light absorption features based on different functions of the front-facing camera, and the electrochromic layer 2 in the non-under-display photographing area AA2 is only used to have the first light absorption feature. Therefore, the two electrochromic layers are independently controlled. The electrochromic layer 2 in the non-under-display photographing area AA2 may be always controlled to have the first light absorption feature.

In addition, it should be noted that in the foregoing control over the electrochromic layer 2, a light absorption feature unnecessarily needs to be converted when a voltage is applied. Based on a feature of the material of the electrochromic layer 2, if the electrochromic layer 2 can have, for example, the first light absorption feature when no voltage is applied to the electrochromic layer 2, when the electrochromic layer 2 is controlled to have the first light absorption feature, a voltage may no longer be applied to the first electrode layer 21 and the second electrode layer 22, so as to reduce power consumption.

In a possible implementation, as shown in FIG. 2, the display panel further includes a drive circuit layer 3. The drive circuit layer 3 is located on the non-light-emitting side of the display layer 1. A drive circuit including a thin film transistor (Thin Film Transistor, TFT), a capacitor, and a signal cable is disposed at the drive circuit layer 3. The drive circuit is electrically connected to the light-emitting component, and is configured to implement driving control on the light-emitting component. The display panel further includes a packaging layer 4 located on the light-emitting side of the display layer 1. The packaging layer 4 successively includes a first inorganic protection layer 41, an organic protection layer 4o, and a second inorganic protection layer 42. The first inorganic protection layer 41 and the second inorganic protection layer 42 may be formed by using a chemical vapor deposition (Chemical Vapor Deposition, CVD) process, and the organic protection layer 40 may be formed by using an ink jet printing (Ink Jet Printing, IJP) process. The display panel may further include a first protection layer 51 and a second protection layer 52 that are located on a side that is of the packaging layer 4 and that is away from the display layer 1. The first protection layer 51 and the second protection layer 52 are configured to protect or insulate a touch electrode. FIG. 2 shows a structure of only the under-display photographing area AA1. Actually, in the non-under-display photographing area AA2, a touch electrode is further disposed on the side that is of the packaging layer 4 and that is away from the display layer 1. The touch electrode may include two layers of structures. The first protection layer 51 is configured to implement insulation between the two layers of structures in the touch electrode, and the second protection layer 52 is configured to implement flattening and protect the touch electrode. The touch electrode is disposed in only the non-under-display photographing area AA2, and the touch electrode is not disposed in the under-display photographing area AA1, to avoid impact between the touch electrode and under-display photographing. The display panel further includes a color filtering layer 6 located on a side that is of the second protection layer 52 and that is away from the display layer 1. The color filtering layer includes filtering parts of different colors, for example, includes a blue filtering part 6B, a green filtering part 6G, and a red filtering part 6R. The blue filtering part 6B corresponds to the blue light-emitting component B, the green filtering part 6G corresponds to the green light-emitting component G, and the red filtering part 6R corresponds to the red light-emitting component R. The color filtering layer is configured to implement filtering. Based on a structure with the color filtering layer, the light-emitting components may not distinguish between colors, but all emit white light, and color display is further implemented by using the color filtering layer. Alternatively, the light-emitting components may separately emit light of different colors, and filtering is further performed by using the color filtering layer. Alternatively, the color filtering layer may be a quantum dot layer, and the light-emitting components may uniformly emit blue light. When the blue light passes through the green filtering part 6G, the corresponding quantum dot layer is excited to generate green light; and when the blue light passes through the red filtering part 6R, the corresponding quantum dot layer is excited to generate red light, so as to implement color display. The display panel further includes a protection layer 7 on a side that is of the color filtering layer 6 and that is away from the display layer 1. The protection layer 7 is provided with an opening corresponding to the electrochromic layer 2, and the electrochromic layer 2 is disposed in the opening at the protection layer 7. The following describes a manufacturing process procedure that includes the color filtering layer 6, the electrochromic layer 2, and the protection layer 7. First, the color filtering layer 6 is formed; then, the first motor layer 21 is formed; further, a protection layer material is coated to form the protection layer 7; afterwards, the electrochromic layer 2 is formed by using a printing process, and leveling processing and drying processing are performed to manufacture the electrochromic layer 2; and then, the second electrode layer 22 is formed. It should be noted that the foregoing manufacturing process is merely an example, and the foregoing structure may be manufactured by using another process procedure. A manufacturing process is not limited in this embodiment of this application.

As shown in FIG. 1 to FIG. 9, an embodiment of this application further provides an electronic device, including: the display panel 100; a front-facing camera 10, where the front-facing camera 10 is located in the under-display photographing area AA1 of the display panel 100, and the front-facing camera 10 is located on a non-light-emitting side of the display layer 1; and a processor (not shown in the figure), where the processor is configured to: when the electronic device operates in a facial recognition mode of the front-facing camera, control the electrochromic layer 2 located in the under-display photographing area AA1 to have the first light absorption feature; and when the electronic device operates in a photographing mode of the front-facing camera, control at least a part of the electro-chromic layer 2 located in the under-display photographing area AA1 to have the second light absorption feature.

A specific structure and principle of the display panel 100 are the same as those in the foregoing embodiment, and details are not described herein again. The processor may control an absorption feature of the electrochromic layer 2 by applying a voltage to the first electrode layer 21 and the second electrode layer 22. Both the first electrode layer 21 and the second electrode layer 22 may be electrically connected to the processor. Alternatively, the following may be set: one of the first electrode layer 21 and the second electrode layer 22 is electrically connected to a fixed potential in another manner, and the other is electrically connected to the processor. A voltage difference between the first electrode layer 21 and the second electrode layer 22 is changed under control of the processor, so as to control the light absorption feature of the electrochromic layer 2.

According to the electronic device in this embodiment of this application, the electrochromic layer, the first electrode layer, and the second electrode layer are disposed in the under-display photographing area. The electrochromic layer may have different light absorption features under action of a difference between voltages applied to the two electrode layers. In the first light absorption feature, the electrochromic layer has a high visible light absorption rate and a low infrared light absorption rate, and therefore is applicable to a facial recognition scenario. In the second light absorption feature, the electrochromic layer has a low visible light absorption rate and a high infrared light absorption rate, and therefore is applicable to a photographing scenario. There-fore, different types of front-facing cameras may not need to be disposed in the two scenarios for distinguishing, and the two functions of facial recognition and photographing can be implemented by using a same type of camera to cooperate with a light absorption feature change of the electrochromic layer, so that a quantity of front-facing cameras in the under-display photographing area can be decreased, thereby reducing adverse impact of an under-display optical com-ponent on display. In addition, in a scenario in which facial recognition does not need to be performed by using the front-facing camera, the electrochromic layer may be con-trolled to have a high visible light absorption rate, that is, a light shielding function of a BM may be implemented by using the electrochromic layer, so as to reduce reflection of external ambient light by the display panel, thereby improv-ing a display effect.

In a possible implementation, the electrochromic layer 2 includes a plurality of mutually independent electrochromic parts 20; the first electrode layer 21 or the second electrode layer 22 includes a plurality of mutually independent color-changing electrodes, and the plurality of mutually indepen-dent electrochromic parts 20 are in a one-to-one correspon-dence with the plurality of mutually independent color-changing electrodes; the plurality of pixel areas 12 are arranged in a matrix including a plurality of pixel rows and a plurality of pixel columns; the plurality of electrochromic parts 20 include a plurality of first electrochromic parts 201 and a plurality of second electrochromic parts 202; each of the first electrochromic parts 201 is located in the pixel row or the pixel column; each of the second electrochromic parts 202 is located outside any pixel row and any pixel column; and the processor is specifically configured to: when a scene contrast in a photographing preview image of the front-facing camera is greater than a preset value, and the elec-tronic device operates in the photographing mode of the front-facing camera, control the plurality of electrochromic parts 20 in the under-display photographing area, so that each of the first electrochromic parts 201 has the second light absorption feature, and each of the second electrochro-mic parts 202 has the first light absorption feature, that is, the light absorption feature arrangement shown in FIG. 13, so as to improve diffraction generated when the scene contrast is large.

In a possible implementation, the processor is specifically configured to: when the scene contrast in the photographing preview image of the front-facing camera is not greater than the preset value, determine a light absorption feature arrangement based on the current photographing preview image; and when the electronic device operates in the photographing mode of the front-facing camera, control the plurality of electrochromic parts 20 in the under-display photographing area based on the currently determined light absorption feature arrangement. For example, if the current photographing preview image meets the scenario shown in FIG. 10, the plurality of electrochromic parts 20 are con-trolled to have the light absorption feature arrangement shown in FIG. 11, so as to pertinently control the light absorption feature arrangement of the electrochromic parts 20 based on features of different images, to pertinently improve diffraction in different scenarios.

In a possible implementation, the electrochromic part 20 is circular in the direction perpendicular to the plane on which the display panel is located.

In a possible implementation, the electrochromic layer 2 is further disposed in the non-under-display photographing area AA2; a part that is of the electrochromic layer 2 and that is in the under-display photographing area AA1 and a part that is of the electrochromic layer 2 and that is in the non-under-display photographing area AA2 are independent of each other; a part that is of either of the first electrode layer 21 and the second electrode layer 22 and that is in the under-display photographing area AA1 and a part that is of either of the first electrode layer 21 and the second electrode layer 22 and that is in the non-under-display photographing area AA2 are independent of each other; and the processor is further configured to control the electrochromic layer 2 located in the non-under-display photographing area AA2 to have the first light absorption feature. The electrochromic layer 2 in the under-display photographing area AA1 needs to be used to select different light absorption features based on different functions of the front-facing camera, and the electrochromic layer 2 in the non-under-display photograph-ing area AA2 is only used to have the first light absorption feature. Therefore, the two electrochromic layers are inde-pendently controlled. The electrochromic layer 2 in the non-under-display photographing area AA2 may be always controlled to have the first light absorption feature.

In a possible implementation, the processor is further configured to: when the electronic device operates in an operating mode of a non-front-facing camera, control the electrochromic layer 2 to have the first light absorption feature, for example, in a non-facial recognition and non-photographing screen-off state, or in a non-facial recognition and non-photographing image display state, control the electrochromic layer 2 to have the first light absorption feature, so as to shield light by using a high visible light absorption rate to reduce reflection of external ambient light, thereby improving an image display effect.

In the embodiments of this application, "at least one" means one or more, and "a plurality of" means two or more. "And/or" describes an association relationship between associated objects, and indicates that three relationships may exist. For example, "A and/or B" may indicate the following three cases: Only A exists, both A and B exist, and only B exists, where A and B may be singular or plural. The character "/" usually indicates an "or" relationship between associated objects. "At least one of the following" or a similar expression thereof is any combination of these items, including a single item or any combination of a plurality of items. For example, at least one of a, b, and c may represent a, b, c, a and b, a and c, b and c, or a, b, and c, where a, b, and c may be singular or plural.

The foregoing descriptions are merely preferred embodiments of this application, and are not intended to limit this application. A person skilled in the art may make various modifications and changes to this application. Any modification, equivalent replacement, improvement, and the like made within the principle of this application shall fall within the protection scope of this application.

What is claimed is:

1. A display panel, comprising:

a display layer, wherein the display layer comprises a non-pixel area and a plurality of pixel areas, and a light-emitting component is disposed in each pixel area of the plurality of pixel areas, wherein the display panel comprises a display area, and the display area comprises an under-display photographing area and a non-under-display photographing area;

in the under-display photographing area, an electrochromic layer is disposed on a light-emitting side of the display layer, and the electrochromic layer does not overlap any pixel area in a direction perpendicular to a plane on which the display panel is located;

a first electrode layer is disposed on a side that is of the electrochromic layer and that faces the display layer, and a second electrode layer is disposed on a side that is of the electrochromic layer and that faces away from the display layer;

the electrochromic layer has a first light absorption feature under action of a first voltage difference, and has a second light absorption feature under action of a second voltage difference, wherein the first light absorption feature is that the electrochromic layer has a first absorption rate for visible light and has a second absorption rate for infrared light, the second light absorption feature is that the electrochromic layer has a third absorption rate for the visible light and has a fourth absorption rate for the infrared light, the first absorption rate is greater than the third absorption rate, and the second absorption rate is less than the fourth absorption rate;

the electrochromic layer comprises a plurality of mutually independent electrochromic parts; and the first electrode layer or the second electrode layer comprises a plurality of mutually independent color-changing electrodes, and the plurality of mutually independent electrochromic parts are in a one-to-one correspondence with the plurality of mutually independent color-changing electrodes;

the plurality of pixel areas are arranged in a matrix comprising a plurality of pixel rows and a plurality of pixel columns;

the plurality of electrochromic parts comprise a plurality of first electrochromic parts and a plurality of second electrochromic parts;

each of the first electrochromic parts is located in a corresponding pixel row or a corresponding pixel column; and each of the second electrochromic parts is located outside any pixel row and any pixel column.

2. The display panel according to claim 1, wherein each electrochromic part is circular in the direction perpendicular to the plane on which the display panel is located.

3. The display panel according to claim 1, wherein the electrochromic layer is further disposed in the non-under-display photographing area.

4. The display panel according to claim 3, wherein a part that is of the electrochromic layer and that is in the under-display photographing area and a part that is of the electrochromic layer and that is in the non-under-display photographing area are independent of each other; and a part that is of either of the first electrode layer and the second electrode layer and that is in the under-display photographing area and a part that is of either of the first electrode layer and the second electrode layer and that is in the non-under-display photographing area are independent of each other.

5. An electronic device, comprising:

a display panel, comprising:

a display layer, wherein the display layer comprises a non-pixel area and a plurality of pixel areas, and a light-emitting component is disposed in each pixel area of the plurality of pixel areas, wherein the display panel comprises a display area, and the display area comprises an under-display photographing area and a non-under-display photographing area;

in the under-display photographing area, an electrochromic layer is disposed on a light-emitting side of the display layer, and the electrochromic layer does not overlap any pixel area in a direction perpendicular to a plane on which the display panel is located;

a first electrode layer is disposed on a side that is of the electrochromic layer and that faces the display layer, and a second electrode layer is disposed on a side that is of the electrochromic layer and that faces away from the display layer;

the electrochromic layer has a first light absorption feature under action of a first voltage difference, and has a second light absorption feature under action of a second voltage difference, wherein the first light absorption feature is that the electrochromic layer has a first absorption rate for visible light and has a second absorption rate for infrared light, the second light absorption feature is that the electrochromic layer has a third absorption rate for the visible light and has a fourth absorption rate for the infrared light, the first absorption rate is greater than the third absorption rate, and the second absorption rate is less than the fourth absorption rate;

the electrochromic layer comprises a plurality of mutually independent electrochromic parts; and the first electrode layer or the second electrode layer comprises a plurality of mutually independent color-changing electrodes, and the plurality of mutually independent electrochromic parts are in a one-to-one correspondence with the plurality of mutually independent color-changing electrodes;

the plurality of pixel areas are arranged in a matrix comprising a plurality of pixel rows and a plurality of pixel columns;

the plurality of electrochromic parts comprise a plurality of first electrochromic parts and a plurality of second electrochromic parts;

each of the first electrochromic parts is located in a corresponding pixel row or a corresponding pixel column; and each of the second electrochromic parts is located outside any pixel row and any pixel column;

a front-facing camera, wherein the front-facing camera is located in the under-display photographing area of the display panel, and the front-facing camera is located on a non-light-emitting side of the display layer; and at least one processor, wherein the at least one processor is configured to: when the electronic device operates in a facial recognition mode of the front-facing camera, control the electrochromic layer located in the under-display photographing area to have the first light absorption feature; and when the electronic device operates in a photographing mode of the front-facing camera, control at least a part of the electrochromic layer located in the under-display photographing area to have the second light absorption feature.

6. The electronic device according to claim 5, wherein the at least one processor is configured to: when a scene contrast in a photographing preview image of the front-facing camera is greater than a preset value, and the electronic device operates in the photographing mode of the front-facing camera, control the plurality of electrochromic parts in the under-display photographing area, so that each of the first electrochromic parts has the second light absorption feature, and each of the second electrochromic parts has the first light absorption feature.

7. The electronic device according to claim 6, wherein the at least one processor is configured to: when the scene contrast in the photographing preview image of the front-facing camera is not greater than the preset value, determine a light absorption feature arrangement based on the current photographing preview image; and when the electronic device operates in the photographing mode of the front-facing camera, control the plurality of electrochromic parts in the under-display photographing area based on the currently determined light absorption feature arrangement.

8. The electronic device according to claim 6, wherein each electrochromic part is circular in the direction perpendicular to the plane on which the display panel is located.

9. The electronic device according to claim 5, wherein the electrochromic layer is further disposed in the non-under-display photographing area;

a part that is of the electrochromic layer and that is in the under-display photographing area and a part that is of the electrochromic layer and that is in the non-under-display photographing area are independent of each other;

a part that is of either of the first electrode layer and the second electrode layer and that is in the under-display photographing area and a part that is of either of the first electrode layer and the second electrode layer and that is in the non-under-display photographing area are independent of each other; and the at least one processor is further configured to control the electrochromic layer located in the non-under-display photographing area to have the first light absorption feature.

10. The electronic device according to claim 5, wherein the at least one processor is further configured to: when the electronic device operates in an operating mode of a non-front-facing camera, control the electrochromic layer to have the first light absorption feature.

* * * * *